June 13, 1961  J. V. DAVIS  2,988,013
INTERCHANGE DEVICE
Filed Sept. 17, 1958  7 Sheets-Sheet 1
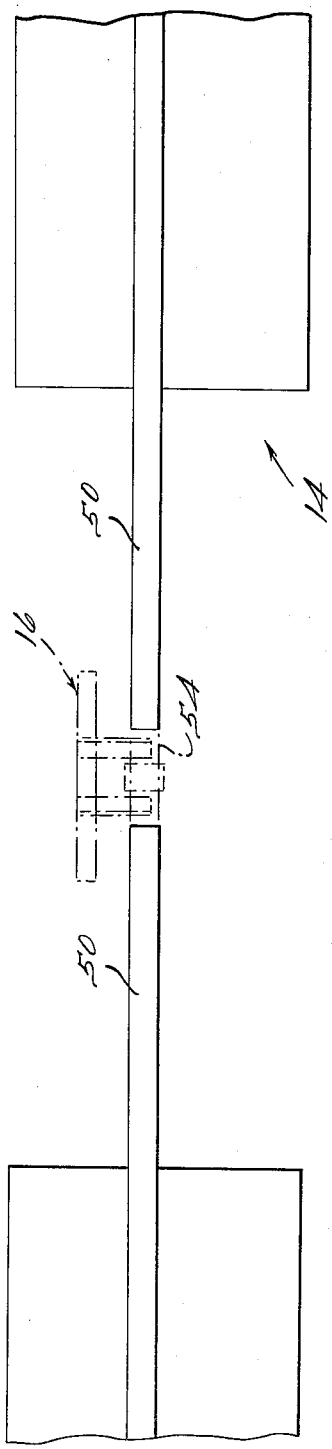
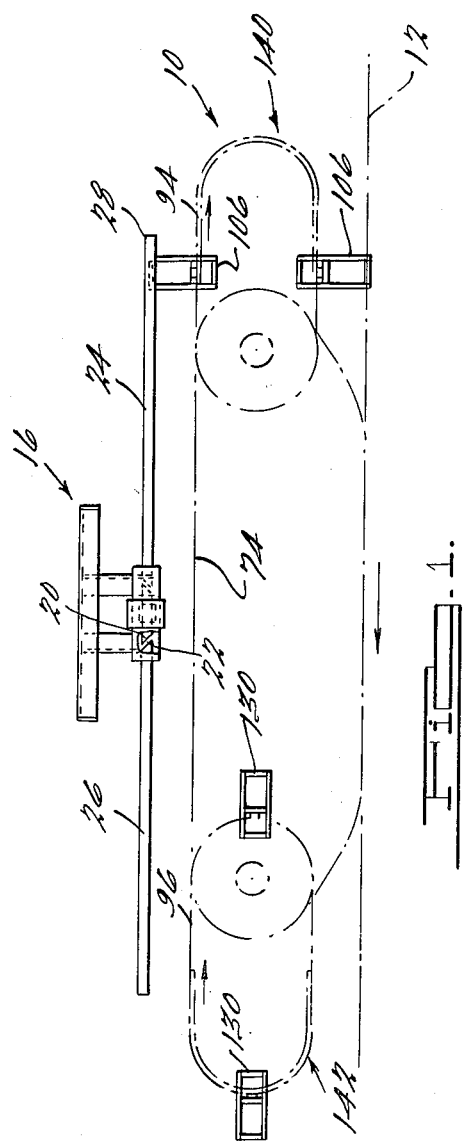
INVENTOR.
John V. Davis
BY
Harness, Dickey & Pierce
ATTORNEYS.

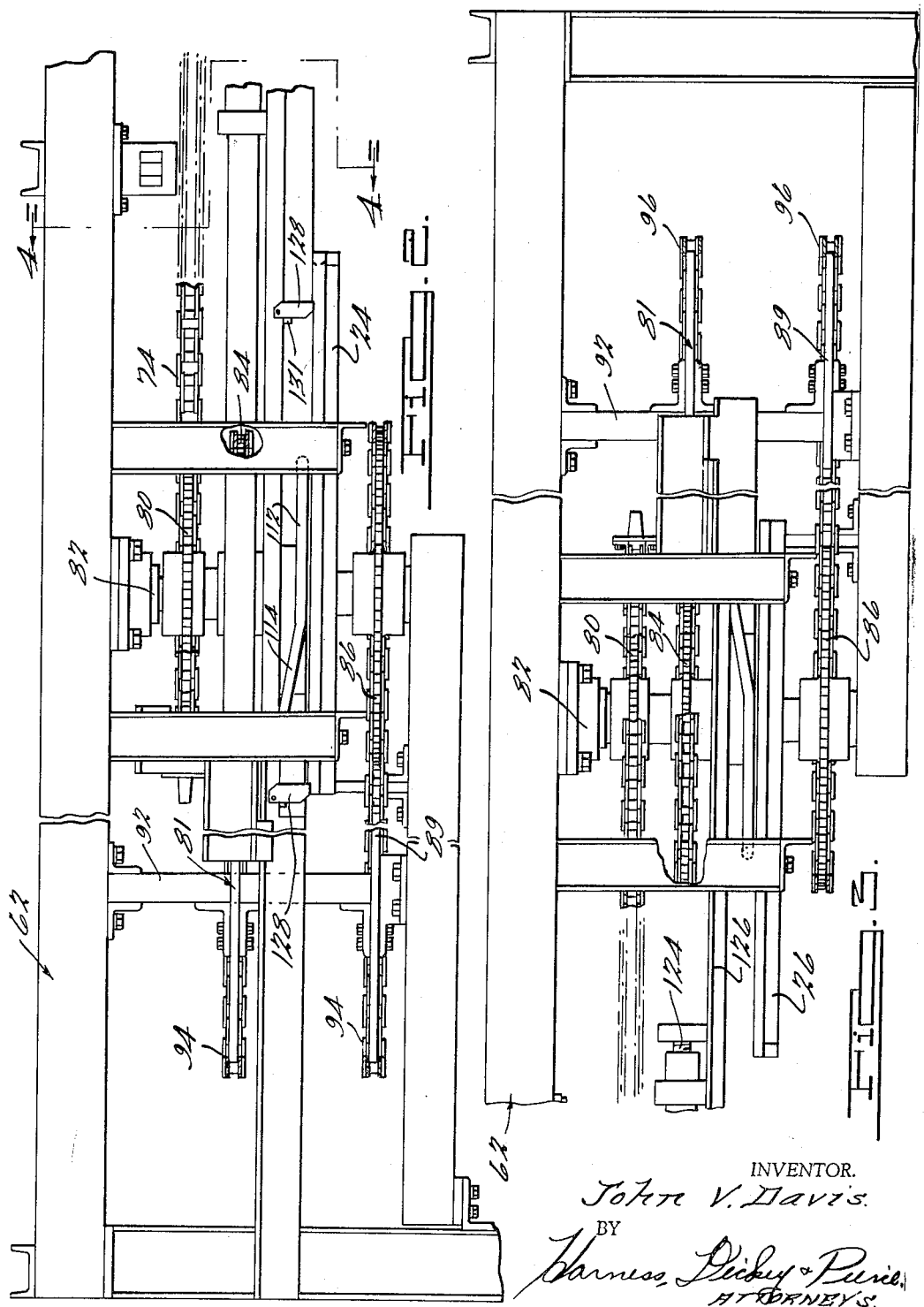

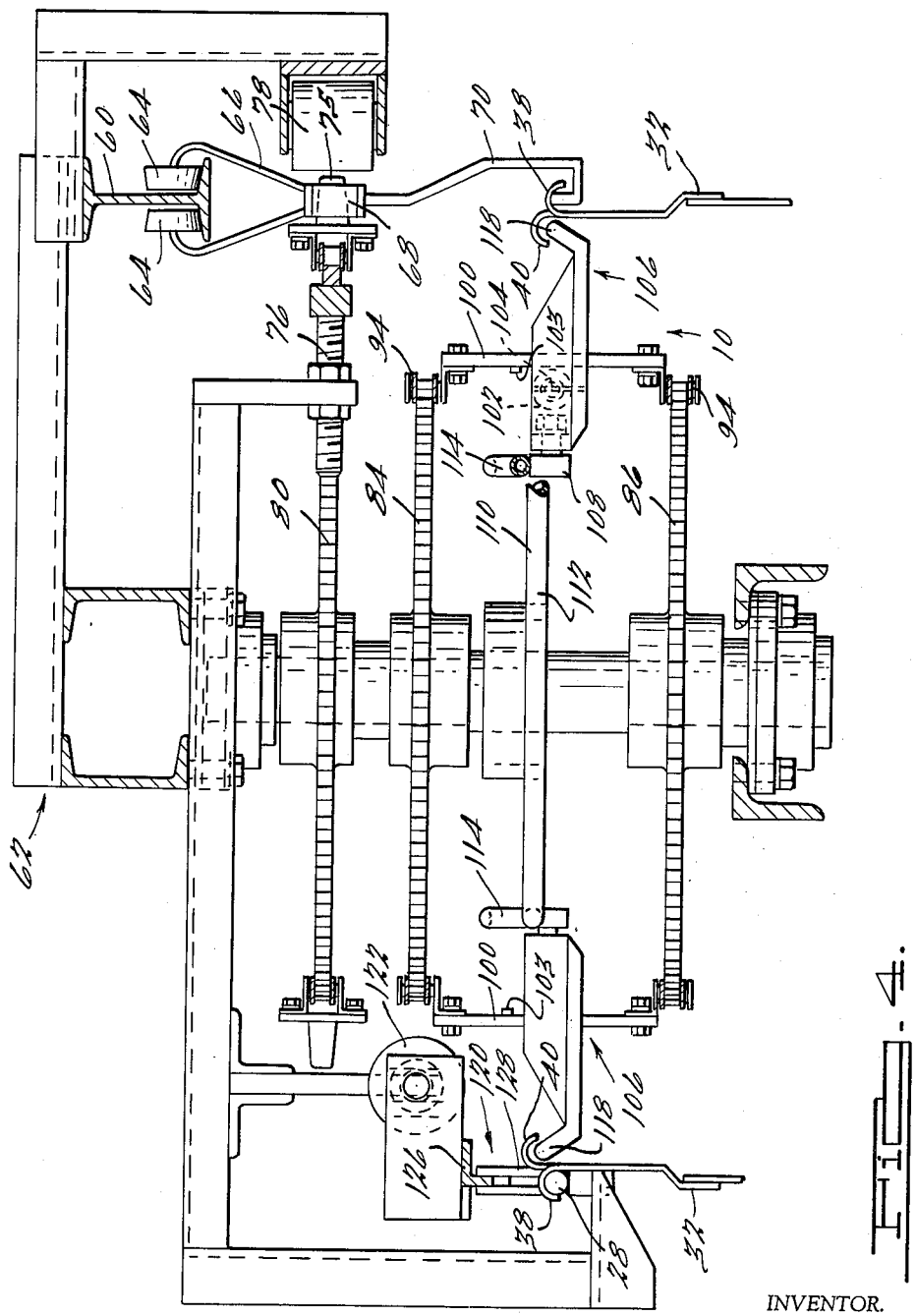

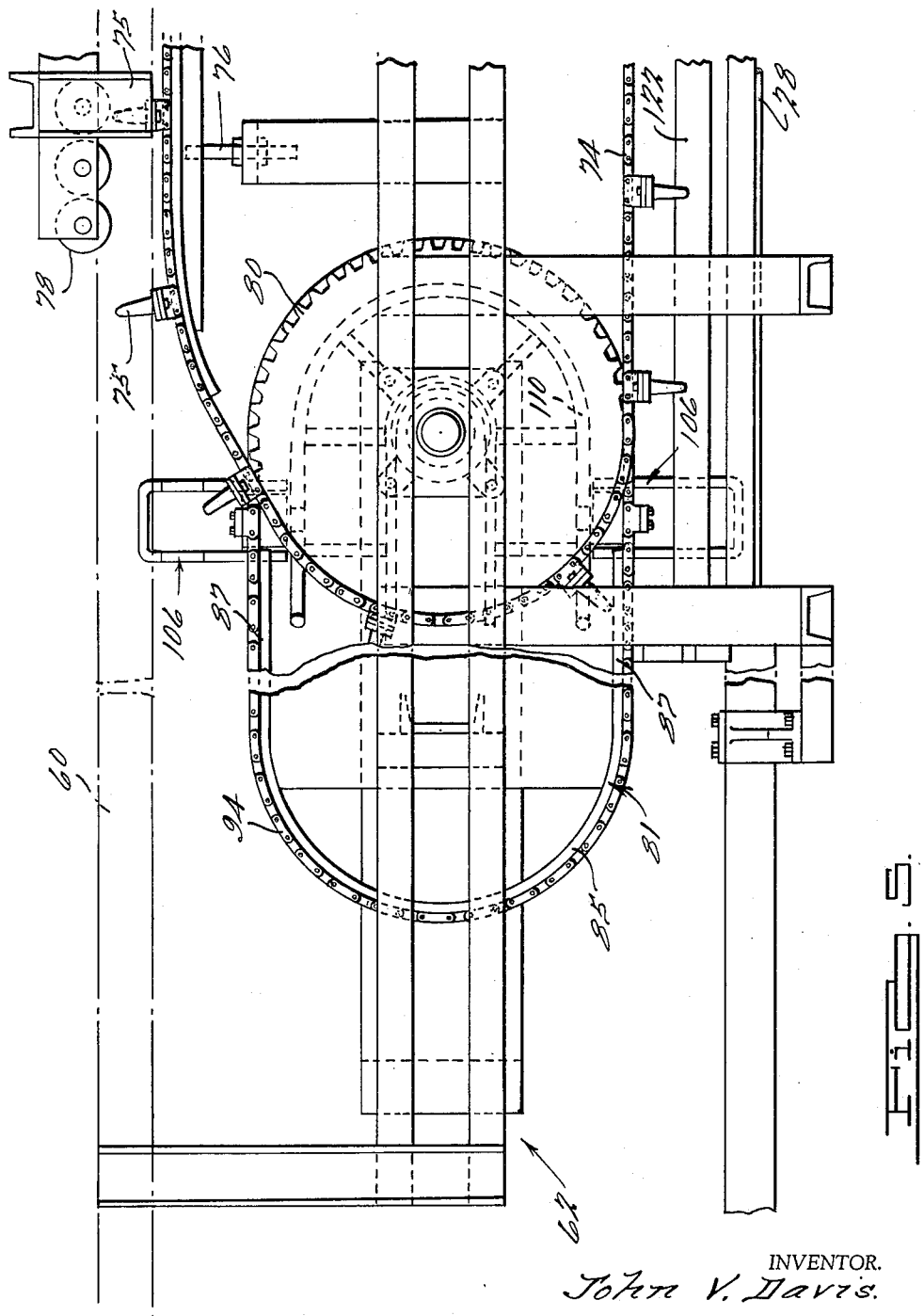

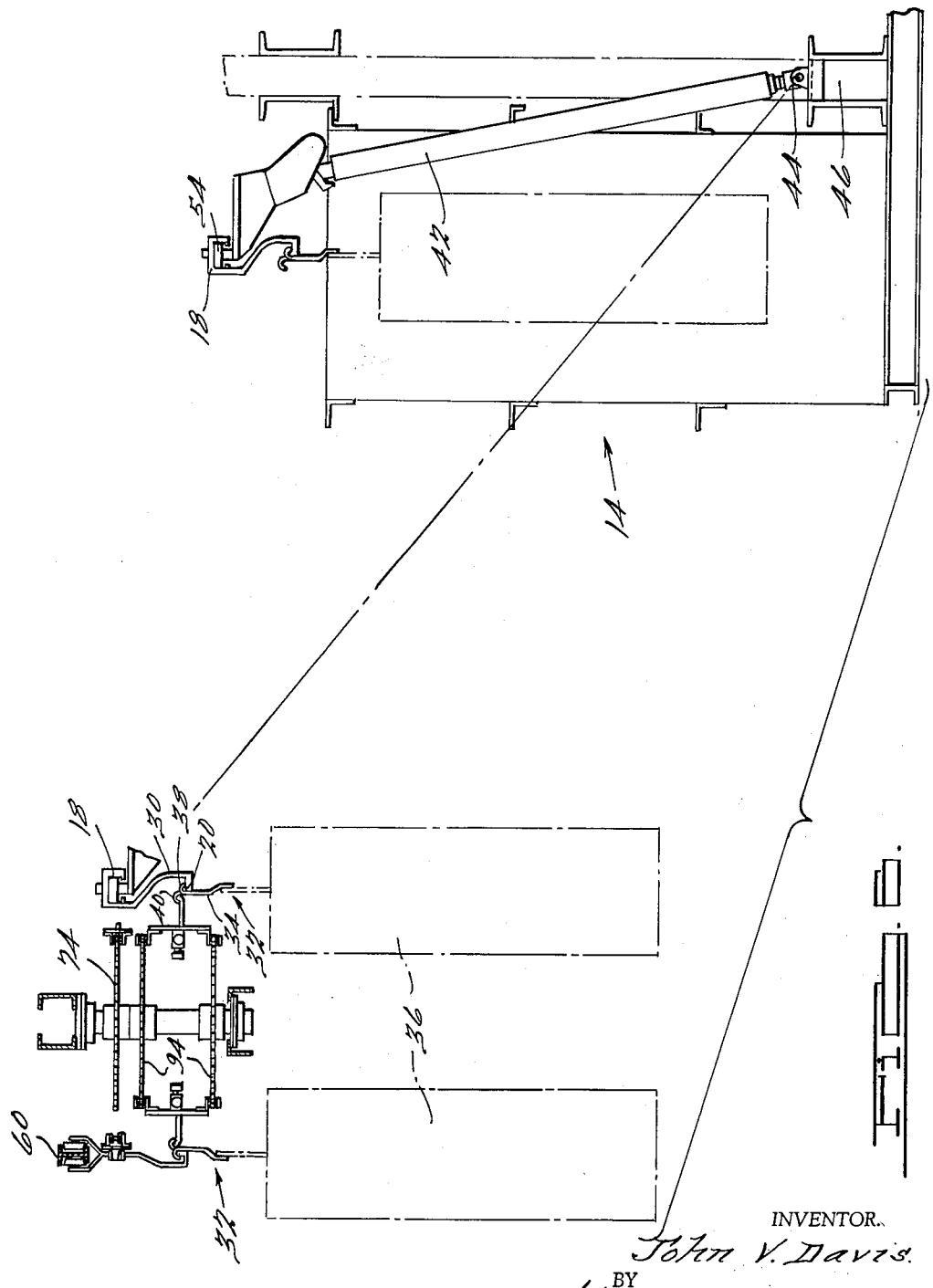

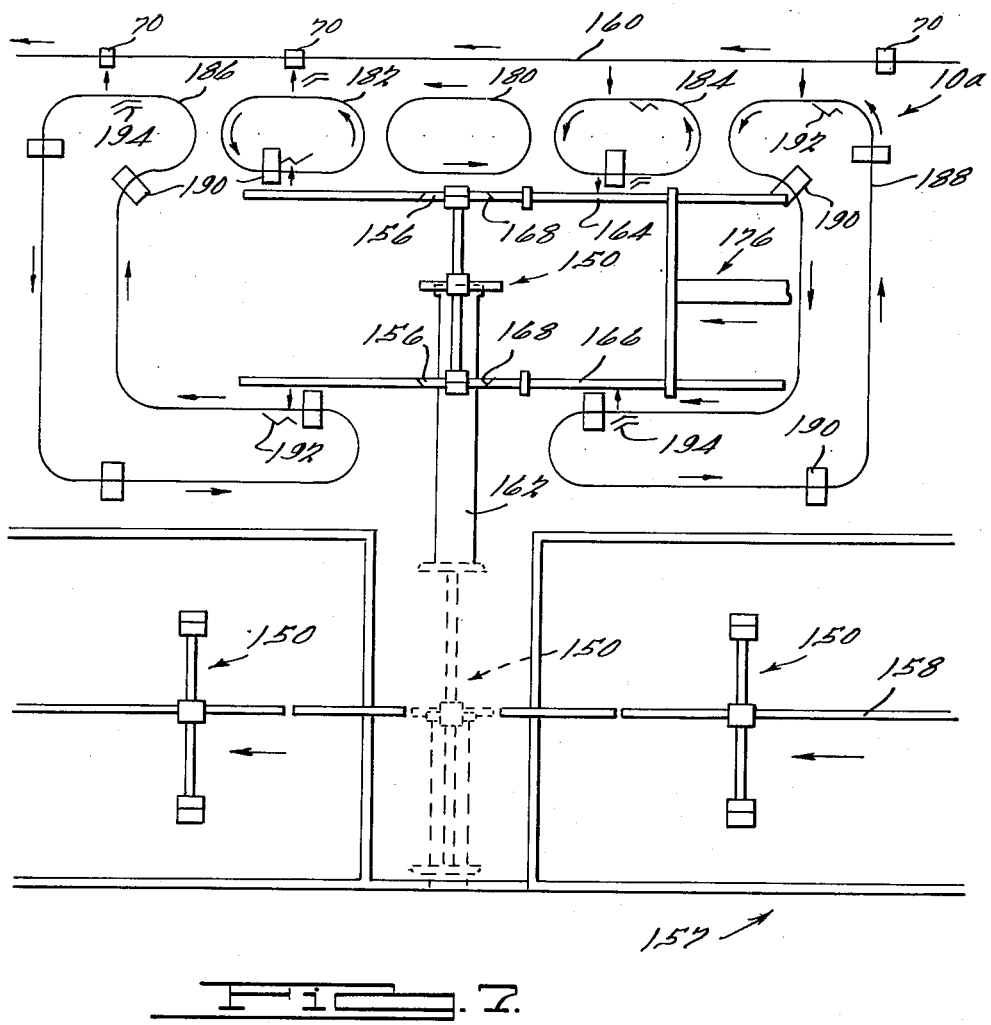

June 13, 1961  J. V. DAVIS  2,988,013
INTERCHANGE DEVICE
Filed Sept. 17, 1958  7 Sheets-Sheet 7
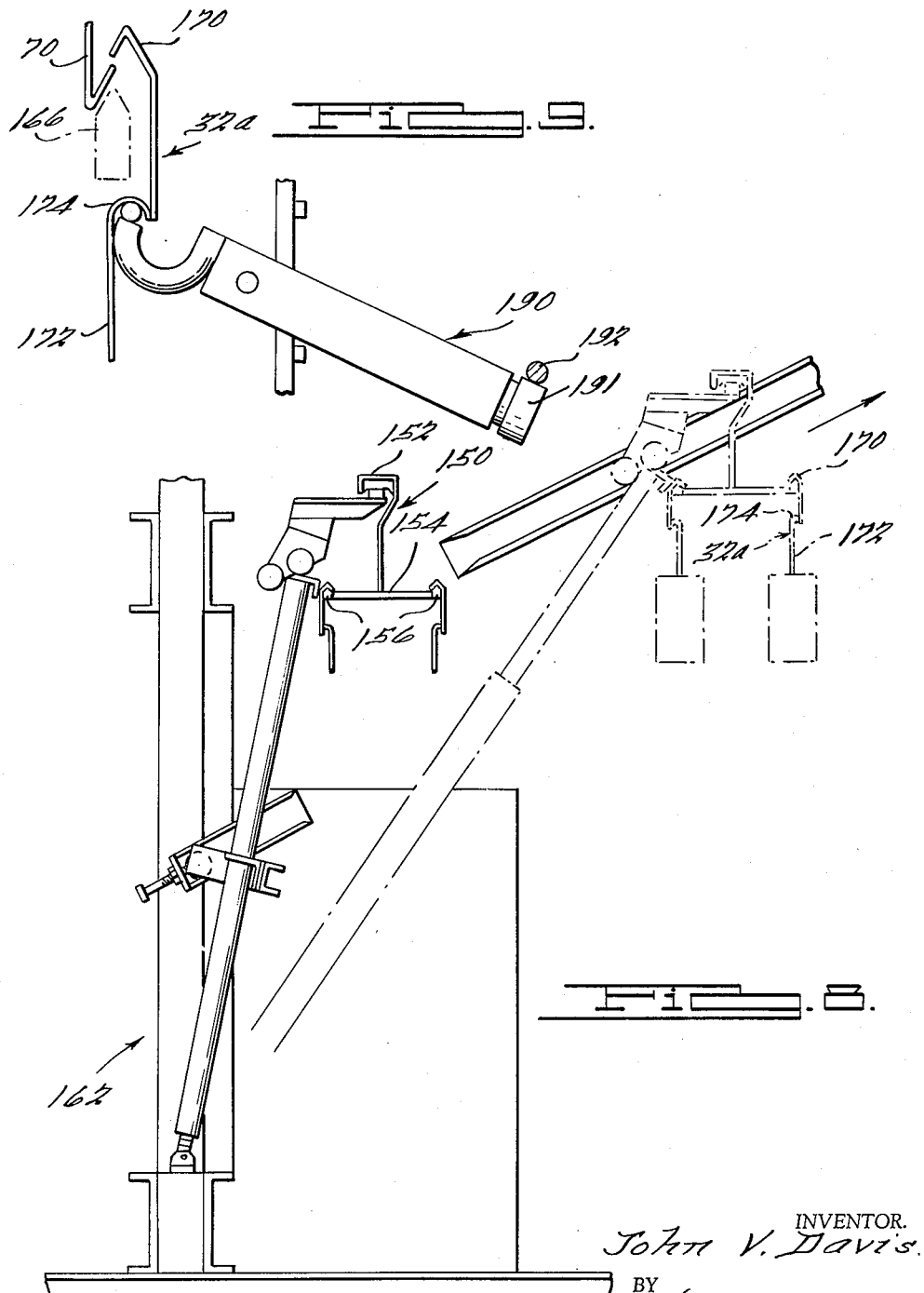
INVENTOR.
John V. Davis
BY
Harness, Dickey & Pierce
ATTORNEYS.

United States Patent Office 2,988,013
Patented June 13, 1961

2,988,013
INTERCHANGE DEVICE
John V. Davis, Grosse Pointe Farms, Mich., assignor to The Udylite Corporation, Detroit, Mich., a corporation of Delaware
Filed Sept. 17, 1958, Ser. No. 761,615
10 Claims. (Cl. 104—96)

This invention relates generally to work handling apparatus and more particularly to an interchange device, namely, mechanism for transferring workpiece supporting racks between a liquid treating machine having rack carriers and a line or shop conveyor. This application is a continuation-in-part of application Serial No. 582,110, filed May 2, 1956 and now abandoned.

In the apparatus illustrated in United States Patent No. 2,645,186, suspended work is transferred back and forth between a shop conveyor and a processing machine, such as a plating apparatus, by a loading and unloading apparatus usually described as a loader. Thus the system shown in the patent consists of a shop conveyor, a processing apparatus, and a loader. The present invention includes the same three elements plus a fourth element consisting of an interchange device or rack transfer mechanism disposed between the loader and the shop conveyor for a purpose that will now be described.

In a plating apparatus of cathode rail type, a carrier is suspended from the rail and one or more racks carrying workpieces are supported on the carrier. In the system disclosed in the aforementioned patent, the carrier as well as the work racks, all of which are of a hook shape, must be transferred together from the plating machine to the shop conveyor and vice versa. If the conveyor carries work at thirty-inch intervals, which is not unusual, and if the conveyor is two hundred feet long, it carries about eighty carriers each of which is expensive.

The principal object of this invention, therefore, is to transfer the work supporting racks between the shop conveyor and the plating machine without removing the carriers from the machine and the loader.

In general, a loader for a plating machine moves between "in" and "out" positions relative to the machine; in the "in" position of the loader, the transfer mechanism on the machine is operable to move a carrier having racks provided with plated workpieces onto the loader and move a carrier with racks having unplated workpieces off the loader for travel through the machine; in the "out" position, the racks with the plated work are moved off the loader onto one portion of a collector bar and racks with parts to be plated are moved from a second portion of the collector bar onto the loader for movement into the machine in the "in" position of the loader.

The shift of the racks from the loader to the shop conveyor is accomplished by a system of endless chains and cam operated pivoted bails mounted on the chains. The pivoted bails are moved by the cams so that they pick up and deposit the work racks in the desired locations.

The system of this invention moves work in both directions, that is, from the shop conveyor to the processing machine and from the processing machine to the shop conveyor so that a continuous operation is effected by loading the conveyor with new work at one point and unloading the processed work at another point.

A carrier may be designed to carry two work racks, in which case the hook of the carrier has two spaced segments which fit into two gaps in two rails in the rack transfer mechanism. These rails are parallel to the adjacent part of the shop conveyor and are, therefore, unequally spaced from this part. Two chain systems are incorporated in the mechanism, one for loading and unloading the nearer rail and one for the more remote rail.

In similar fashion, the carrier hooks may suspend more than two racks and in such case a corresponding number of segments, rails and chain systems would be provided. Conversely, if the carrier hook suspends only one work rack, as hereinafter illustrated and described in detail, there will be only one segment, one rail and one chain system.

Further objects, features and advantages of this invention will become apparent from a consideration of the following description, the appended claims and the accompanying drawing in which:

FIGURE 1 is a diagrammatic plan view of the rack transfer mechanism of this invention;

FIGURE 2 is a fragmentary elevational view of a portion of the rack transfer mechanism of this invention;

FIGURE 3 is a fragmentary elevational view of the remainder of the rack transfer mechanism not shown in FIG. 2;

FIGURE 4 is an enlarged sectional view looking substantially along the line 4—4 in FIG. 2;

FIGURE 5 is an enlarged plan view of a portion of the transfer mechanism;

FIGURE 6 is a diagrammatic transverse sectional view of the rack transfer mechanism, a plating machine and a hydraulic loader for moving rack carriers between the machine and the rack transfer mechanism;

FIGURE 7 is a diagrammatic plan view of a modified form of the rack transfer mechanism of this invention adapted for use with carriers for supporting two racks;

FIGURE 8 is a vertical sectional view of part of the modified mechanism shown in FIG. 7, and FIGURE 9 is a diagrammatic view illustrating the removal of a rack from a support by a pivoted bail in the mechanism shown in FIG. 6.

With reference to the drawings, the rack transfer mechanism of this invention, indicated generally at 10, is illustrated diagrammatically in FIG. 1 in assembly relation with a line or shop conveyor 12 and a plating machine 14 provided with a loader 16 movable between "in" and "out" positions illustrated in broken and full lines, respectively. The machine 14 is of the type having a cathode rail on which rack carriers 18 are slidably supported and propelled through the machine. Each carrier is of the configuration illustrated in FIG. 6 and includes a horizontal rail or gap segment 20 of a length to span the space or gap 22 (FIG. 1) between first and second portions 24 and 26 of a horizontal collector bar 28 disposed between the transfer mechanism 10 and the machine 14. The segment 20 for each carrier 18 is located at the terminal end of a downwardly extending hook-shape portion 30 at the lower end of the carrier 18. A work rack 32 may be of a number of desired configurations and is illustrated as having a downwardly extending portion 34, to which a workpiece 36 is attached, and a first hook portion 38 at its upper end which is centered with respect to the portion 34 and is adapted to be hooked over the segment 20 on a carrier 18 in a supported position of the rack. A second hook portion 40 of the rack 32 is disposed substantially at the level of the hook portion 38 and extends in the opposite direction for a purpose to appear later.

The loader 16 is described herein only briefly, inasmuch as it is generally similar and functions like the one shown in Patent No. 2,645,186. The loader includes a pair of extensible members 42, only one of which is shown in FIG. 6, having their lower ends hinged at 44 to a portion 46 of the machine 14 in an open space in the machine. The outer extensible portions of the members 42 are guided upwardly and outwardly of the machine so that when the members 42 are extended, usually by a hydraulic cylinder assembly (not shown), the segment 20 is moved to a final horizontal position in alignment with the spaced portions 24 and 26 of the collector bar 28. The loader is then in an "out" position. In the "in" position, a rail segment 54 carried by the loader is aligned with spaced portions of the cathode rail 50 in the machine 14.

The shop conveyor 12 is supported on an I-beam 60 a portion of which is connected to a frame 62 which supports the rack transfer mechanism 10. Pairs of rollers 64 ride on the beam 60 and carry depending brackets 66 to which a chain 68 is secured. The chain 68 carries hooks 70, spaced at predetermined intervals, and work-supporting racks 32 for work to be plated are suspended from the hooks 70.

The rack transfer mechanism 10 consists of a first endless chain 74 having lugs 75 (FIG. 4) of a size to project through the links of the chain 68. An adjustable bracket mechanism 76 is mounted on the frame 62 and engages one side of the chain 74 for maintaining that side in a position such that the lugs 75 on that side project through the chain 68 which is prevented from moving away from the chain 74 by rollers 78 on the frame 62. The chain 74, which constitutes a Caterpillar drive for the mechanism 10, is trained about a pair of sprockets 80 secured to horizontally spaced vertical shafts 82 located on a line parallel to the conveyor 12. Each of the shafts 82 carries another pair of sprockets 84 and 86 which are spaced apart vertically and located below the sprocket 80. The sprocket 84 on each shaft 82 is disposed in horizontal alignment with a curved track 81, having an intermediate portion 85 of semi-circular shape and a pair of parallel straight end portions 87, mounted on the frame 62. The sprocket 86 on each shaft 82 is horizontally aligned with a curved track 89 which is identical to and positioned below and parallel with a track 81. Parallel endless chains 94 are trained about a pair of sprockets 84 and 86 and their corresponding tracks 81 and 89. A pair of parallel endless chains 96 are trained about the other pair of sprockets 84 and 86 and their corresponding tracks 81 and 89.

As best appears in FIG. 1, with this arrangement of the chains 74, 94 and 96, when the shop conveyor 12 is moved toward the left as viewed in FIG. 1, the chain 74 is moved in a clockwise direction and the chain 94 and 96 are likewise driven in clockwise directions by virtue of the mounting of the sprockets 80, 84 and 86 on the shafts 82. A pair of vertically extending support members 100 are connected to and extend between diametrically opposite portions of the chains 94. Each of the members 100 carries a bearing support 102 for a horizontal shaft 104 which constitutes part of a pickup bail or frame mechanism, indicated generally by the numeral 106. The bearing supports 102 provide for a pivotal support of each frame 106 intermediate its ends so that it is movable up and down about the support 102. At its inner end, each pickup bail 106 is provided with a cam follower roller 108 positioned in rolling engagement with the underside of a cam member 110 consisting of a bent U-shaped tubular member mounted on the frame 62 and provided with horizontal portions 112 and inclined portions 114. The opposite end of each pickup frame 106 terminates in a horizontal tubular portion 118 disposed outwardly of the frame 100.

As shown in FIG. 4, when a pickup frame 106 is substantially horizontal the portion 118 thereof is substantially at the level of the collector bar 28 and is located adjacent to and to one side of the collector bar 28. In this position, the portion 118 is movable upwardly into lifting engagement with a rack hook portion 40 or downwardly for releasing a rack portion 40. Pickup frames or bails 130, identical to the frames 106, are pivotally mounted in the same manner on the parallel chains 96.

A pusher mechanism 120 consists of a hydraulic cylinder assembly 122 supported on the frame 62 and provided with a piston rod 124 connected to an angle shape pusher rod 126 mounted on the frame 62 for horizontal sliding movement. Pusher dogs 128 are pivotally supported on and suspended from the pusher rod 126 and are provided with stops 131 for preventing swinging movement of the dogs 128 in a clockwise direction as viewed in FIG. 2 without preventing swinging movement in a counterclockwise direction. The pusher dogs 128 are operable on extension of the piston rod 124 to engage the upper hook portions 38 of work-supporting racks 32 slidably supported on the collector bar 28 and the gap segment 20 for sliding racks off the bar portion 24 onto a carrier segment 20 and off the segment 20 onto the collector bar portion 26.

The endless chains 94 and 96, and the connecting members 100 secured thereto, constitute endless conveyors 140 and 142, respectively, of the closed loop type. In the operation of the mechanism 10, the Caterpillar drive chain 74 is driven from the line conveyor 12 and in turn drives the loop conveyors 140 and 142 at the same speed. The pickup frames 106 on the conveyor 140 operate to pick up racks 32 from the hooks 70 on the line conveyor 12 and deposit them on the collector bar portion 28.

In effecting a rack pickup, a frame 106 traveling in a clockwise direction as viewed in FIG. 5 is swung upwardly about its bearing support 102 by the action of the cam 110 shown in FIG. 4 on the follower roller 108 on the frame 106. The roller 108 first contacts an inclined portion 114 of the cam 110 and, as the tubular frame portion 118 moves to the position underneath and adjacent a rack hook 40, rides down the inclined portion 114 to lift the track off the hook 70 as the roller 108 rides onto the straight cam portion 112. When the conveyor 140 has moved the frame supported rack to a position in which the hook portion 38 thereof is above the collector bar 28, the roller 108 rides upwardly on a cam portion 114 so that the frame 106 drops the hook portion 38 onto the collector bar.

The pickup frames 130 on the conveyor 142 operate in an identical manner to pick up racks 32 from the collector bar 28 and deposit them on hooks 70 on the conveyor 12. The drive of the conveyors 140, 142 and 12 at the same speeds and the spacing of the bails 106 and 130 and the hooks 70 so that when a bail is traveling parallel to and is adjacent the conveyor 12, a hook 70 is adjacent the bail, insure the desired rack transfers.

To insure initial contact of a roller 108 with an inclined cam portion 114, each pickup frame 106 and 130 is constructed so that the weight thereof biases it in a clockwise direction as viewed in FIG. 4, and a stop 103 on the support member 100 engages the frame and prevents swinging movement thereof past a position in which the roller is engaged with a cam portion 114. As an alternative, the frame 106 or 130 may be proportioned such that when it is not loaded it assumes substantially the position shown in FIG. 4.

The pusher dogs 128 operate to transfer a rack 32, having parts to be plated thereon, from the collector bar portion 24 onto the segment 20 of a carrier 18 on the loader 16. The pusher dogs 128 also operate to move a rack 32 having plated parts thereon from the segment 20 onto the collector bar portion 26 where it is picked up by a pickup frame 130 on the conveyor 142. The conveyor 142 then deposits the rack 32 with the plated parts thereon on a hook 70 on the shop conveyor 12.

It can thus be seen that a continuous process of transferring racks with parts to be plated from the conveyor 12 to the collector bar 28 and thence to the loader 16 for transfer to the machine 14 is obtained. After the rack has been moved through the machine, it is removed by the loader 16 for travel onto the collector bar portion 26 and thence to the conveyor 142 from which it is transferred to the shop conveyor 12. The entire transfer and treatment process is carried out without removing any rack carriers 18 from the machine 14 and the loader 16.

The modified transfer mechanism 10a of this invention is illustrated in FIGS. 7, 8 and 9 and utilizes the same basic structure and sequence of operation utilized in the transfer mechanism 10 previously described. The mechanism 10a is an adaptation of the mechanism 10 for handling carriers of the type illustrated at 150 in FIGS. 7 and 8. The carrier 150 has an upper hook portion 152 and a lower transversely extending portion 154 which supports a pair of parallel gap segments 156, each of which is adapted to carry a rack for work to be plated. The carrier 150 thus differs from the carrier 18 illustrated in the mechanism 10 in that the carrier 150 carries two racks while the carrier 18 is designed for supporting a single rack.

The transfer mechanism 10a is illustrated in assembly relation with a plating machine 157 having a cathode rail 158, a straight line shop conveyor 160, and a loader 162 like the loader 16 previously described. The transfer mechanism 10a includes a pair of spaced parallel collector bars 164 and 166 having opposed gaps 168 of a size to receive the corresponding gap segments 156 on a carrier 150. The racks with raw work to be plated are moved from the right-hand portions of the bars 164 and 166 onto the segments 156 on a loader supported carrier 150, to be delivered to the machine 157. Racks with processed work are moved from the segments 156 to the left-hand portions of the bars 164 and 166 to be returned to the shop conveyor 160 from which they are eventually unloaded. The racks, indicated generally at 32a, are of the type having an upper hook portion 170, a lower portion 172 from which the work is suspended, and an intermediate hook-shaped portion 174 disposed between the portions 170 and 172. The racks 32a are thus of a slightly different shape than the racks 32 previously described but the different portions thereof are designed to perform the same functions in both racks.

The transfer mechanism 10a also includes an endless Caterpillar drive chain 180 which meshes with and is driven by the shop conveyor 160 in the same manner that the shop conveyor 12 meshes with and drives the chain 74 as shown in FIG. 5. A first pair of closed loop conveyors 182 and 184, corresponding to the conveyors 140 and 142 in the mechanism 10, are driven from the Caterpillar drive chain 180 so that the loops travel at the same speed as the line conveyor 160. A second pair of substantially L-shaped closed loops 186 and 188 are driven by the loop conveyors 182 and 184. As illustrated in FIG. 7, a first portion of each of the loop conveyors 182 and 184 is positioned adjacent the collector bar 166 adjacent the machine 157 and a second portion is adjacent the shop conveyor 160. Both of the loop conveyors 182 and 184 are adjacent the collector bar 164. By virtue of this arrangement, the conveyors 182 and 184 are operable to transfer racks to and from the collector bar 164, and the loops 186 and 188 are operable to transfer work to and from the other collector bar 166.

Each of the loop conveyors 182, 184, 186 and 188 carries at least one pickup bail or frame 190 (FIG. 9), identical to the pickup frames 106 and 130 previously described. Each of the first loop conveyors 184 and 186 carries a single pickup frame 190, and each of the second loop conveyors 186 and 188 carries four pickup frames 190 arranged so that the space between adjacent frames on each conveyor is equal to the length of a first loop conveyor 182 or 184. This length is twice the spacing between work rack carrying hooks 70 on the shop conveyor 160. The cams which cooperate with the follower rollers 191 on the pickup frames 190 and operate to pivotally move the frames in directions to engage the hook portion 174 on a rack 32a for lifting the rack off a collector bar 164 or 168 or a hook 70 are indicated by the numeral 192. The cams which operate to pivotally move the frames 190 in directions to drop a rack 32a so that the upper hook portion 170 thereof is deposited on a collector bar or a hook 70 are indicated by the numeral 194.

In the operation of the transfer mechanism 10a, the loop conveyors 184 and 188 operate to pick up racks 32a with raw work thereon from a pair of adjacent hooks 70 on the shop conveyor 160 while the conveyor is moving in the direction illustrated in FIG. 7. The pickup frames 190 on the conveyors 184 and 188 which are carrying the picked up racks 32a then deposit these racks on the collector bars 164 and 166, respectively. A pusher mechanism 176, like the mechanism 120 previously described, transfers the racks 32a deposited on the collector bars 164 and 166 onto the gap segments 156 of a carrier 150 supported on the loader 162. Concurrently, with this transfer of the racks 32a carrying work to to be plated, the pusher mechanism 196 transfers racks 32a from the gap segments 156 to the collector bars 164 and 166. The loader 162 moves the racks with unplated work into the machine 157 and the conveyors 182 and 186 pick up the racks 32a with the plated work from the collector bars 164 and 166 and deposit these racks on a pair of adjacent hooks 70 on the shop conveyor 160.

It can thus be seen that the mechanism 10a operates like the mechanism 10 to maintain a continual movement of racks with work to be plated from the shop conveyor 160 to the machine 157 and for a reverse movement of racks with plated work, without at any time requiring removal of a carrier 150 from the machine 157 and its loader 162. Because the carrier 150 is constructed so that it supports a pair of work racks 32a, two collector bars and two pairs of loop conveyors are required in the mechanism 10a in place of the single collector bar and the single pair of loop conveyors utilized in the mechanism 10.

Racks 32 and 32a of different shapes have been illustrated in the mechanisms 10 and 10a only for the purpose of showing that racks of different shapes may be used. In both the mechanisms 10 and 10a the pickup frames 106, 130 and 190 are disposed so that in a substantially horizontal position thereof the working end is substantially at the level of the hook portion to be engaged on a rack.

It will be understood that the specific constructions of the improved interchange devices or work transfer mechanisms which are herein disclosed and described are presented for purposes of explanation and illustration and are not intended to indicate limits of the invention, the scope of which is defined by the following claims.

What is claimed is:

1. Apparatus for transferring work-supporting racks between a line conveyor and a loader for a liquid treating machine, said apparatus comprising a collector bar for supporting racks, transfer apparatus for moving a rack from one portion of said collector bar onto said loader concurrently with moving a rack from the loader onto a second portion of a said collector bar, first conveyor means extending between said line conveyor and said collector bar for transferring racks with parts to be liquid treated from said line conveyor to said first portion of the collector bar, and second conveyor means extending between said collector bar and said line conveyor for transferring racks with parts which have been treated in said machine from said second collector bar portion to said line conveyor.

2. Apparatus for transferring work-supporting racks between a line conveyor and a loader for a liquid treating machine, said apparatus comprising a collector bar for supporting racks, pusher apparatus for moving a rack from one portion of said collector bar onto said loader concurrently with moving a rack from the loader onto a second portion of said collector bar, first endless chain means adjacent said line conveyor and said first portion of the collector bar, pickup frames on said endless chain means for picking up and depositing racks on said first collector bar portion and said line conveyor, second endless chain means positioned adjacent said second collector bar portion and said line conveyor, pickup frames on said second endless chain means for picking up and depositing racks on said second collector bar portion and said line conveyor, the spacing between the pickup frames being the same on each endless chain means, and means providing for travel at the same speed of said endless chain means so that the number of racks deposited on the first portion of the collector bar corresponds to the number removed from the second portion.

3. Apparatus for transferring work-supporting racks between a line conveyor and a loader for a liquid treating machine having rack carriers, said apparatus comprising a collector bar for supporting racks, pusher apparatus for moving a rack from one portion of said collector bar onto said loader concurrently with moving a rack from the loader onto a second portion of said collector bar, first endless chain means adjacent said line conveyor and said first portion of the collector bar, pickup frames on said endless chain means for picking up and depositing racks on said first collector bar portion and said line conveyor, second endless chain means positioned adjacent said second collector bar portion and said line conveyor, pickup frames on said second endless chain means for picking up and depositing racks on said second collector bar portion and said line conveyor, the spacing between the pickup frames being the same on each endless chain means, and Caterpillar drive means driven by said line conveyor and arranged in a driving relation with said endless chain means providing for travel at the same speed of said endless chain means so that the number of racks deposited on the first portion of the collector bar corresponds to the number removed from the second portion.

4. An interchange device comprising in combination a rail having a gap therein, a gap segment in said gap movable relative to said rail, means attached to said segment for moving said segment, conveyor means disposed adjacent to said rail and extending to a position adjacent to a line conveyor and moving in a closed path from said line conveyor to said rail and vice versa, said conveyor means including a pair of vertically spaced movable members extending along said closed path and movable therealong and a plurality of pickup devices attached to said movable members and disposed therebetween, said pickup devices having a frame, a support bar on one end of said frame and a roller on the opposite end of said frame, said frame being pivotally supported intermediate its ends on said movable members, and cam rails positioned in the path of motion of said roller as said movable members move in said closed path, said cam rails being effective to sequentially pivot said frame as said roller contacts said rails to thereby cause said support bar alternately to move upwardly and then to move downwardly.

5. An interchange device comprising in combination a collector bar having a gap therein, a gap segment in said gap movable relative to said bar, means attached to said segment for moving said segment, conveyor means disposed adjacent to said bar and extending to a position adjacent to a line conveyor and moving in a closed path from said line conveyor to said bar and vice versa, said conveyor means including a pair of vertically spaced movable members extending along said closed path and movable therealong and a plurality of pickup devices attached to said movable members and disposed therebetween, said pickup devices having a frame, a support bar on one end of said frame and a roller on the opposite end of said frame, said frame being pivotally supported intermediate its ends on said movable members, cam rails positioned adjacent to said line conveyor and having a first portion adapted to engage said roller as said movable members are advanced to effect pivoting of said frame so that the said support bar moves upwardly and a second portion positioned adjacent to said collector bar adapted to engage said roller as said movable members are advanced to effect pivoting of said frame so that said support bar moves downwardly.

6. Apparatus for transferring work-supporting racks between a line conveyor and a loader for a liquid treating machine having rack carriers, said apparatus comprising a collector bar, transfer apparatus for moving a rack from one portion of said collector bar onto said loader and for moving a rack from the loader onto a second portion of a said collector bar, first conveyor means for transferring racks with parts to be liquid treated from said line conveyor to said first portion of the collector bar, second conveyor means for transferring racks with parts which have been treated in said machine from said second collector bar portion to said line conveyor, and means operatively connecting said conveyors so that they travel at the same speed.

7. An interchange device comprising in combination a pair of spaced parallel rails each having a gap therein, gap segments in each said gap, means attached to said gap segments for moving the gap segments laterally relative to said rails, separate conveyor means disposed adjacent each said rail and extending between a position adjacent to said rail and a line conveyor and moving in closed paths therebetween, each said conveyor means including a pair of vertically spaced movable members extending along said closed paths and movable therealong and a plurality of pickup devices attached to said movable members and disposed therebetween, said pickup devices having a frame, a support bar on one end of said frame and a roller on the opposite end of said frame, said frame being pivotally supported intermediate its ends on said movable members, and cam rails positioned in the path of motion of said roller as said movable members move in said closed paths, said cam rails being effective to sequentially pivot said frame as said roller contacts said rails to thereby cause said support bar alternately to move upwardly and then to move downwardly, means for synchronously driving said conveyor means so that the pivoting action of the pickup devices associated with each conveyor means occurs concurrently.

8. An interchange device in accordance with claim 7 wherein there are a pair of conveyor means disposed between said line conveyor and said rail having associated cam rails effective to transfer members from said line conveyor to said rails and a second pair of transfer conveyors disposed between said line conveyor and said rail having associated cam rails adapted to effect the transfer of members from said rail to said line conveyor and wherein the transfer of all said members occurs simultaneously.

9. In an interchange device, conveyor means including a pair of vertically spaced movable members extending along a closed path and movable therealong and a plurality of pickup devices attached to said movable members and disposed therebetween, said pickup devices having a frame, a support bar on one end of said frame and cam follower means on the opposite end of said frame, said frame being pivotally supported intermediate its ends on said movable members, and cam means positioned in the path of motion of said cam follower means as said movable members move in said closed path, said cam means being effective to sequentially pivot said frame as said cam follower means contacts said cam means to thereby cause said support bar alternately to move upwardly and then to move downwardly.

10. In combination with a line conveyor, a liquid treating machine having a loader provided with a gap segment movable between in and out positions, a collector bar having first and second portions disposed on opposite sides of said gap segment in the out position thereof, and pusher means for transferring work-supporting racks from a first portion of said collector bar onto said gap segment and from said gap segment onto a second portion of said collector bar, means for feeding racks with untreated workpieces thereon to said first collector bar portion for movement of the racks onto said gap segment on each operation of the said pusher means, and means for feeding racks with treated workpieces thereon from said second collector bar portion to said line conveyor, said means comprising an endless conveyor operatively connected to said line conveyor for movement at a predetermined speed relative thereto, first means on said endless conveyor for picking up racks from said line conveyor and for depositing said racks on said first collector bar portion, and second means on said endless conveyor for picking up racks from said second collector bar portion and for depositing said racks on said line conveyor.

References Cited in the file of this patent

UNITED STATES PATENTS

| | | |
|---|---|---|
| 2,116,430 | Gordon | May 3, 1938 |
| 2,344,155 | McBride et al. | Mar. 14, 1944 |
| 2,609,083 | Leach | Sept. 2, 1952 |
| 2,645,186 | Davis | July 14, 1953 |
| 2,681,015 | Davis | June 15, 1954 |
| 2,771,175 | Da Costa | Nov. 20, 1956 |
| 2,816,643 | Klamp | Dec. 17, 1957 |
| 2,845,034 | Harrison | July 29, 1958 |